US009574578B2

(12) United States Patent
Frick et al.

(10) Patent No.: US 9,574,578 B2
(45) Date of Patent: Feb. 21, 2017

(54) FLAP ACTUATOR

(71) Applicant: Liebherr-Aerospace Lindenberg GmbH, Lindenberg/Allgäu (DE)

(72) Inventors: Joern Frick, Waldburg (DE); Anton Gaile, Leutkirch (DE); Franz Weixler, Kempten (DE)

(73) Assignee: LIEBHERR-AEROSPACE LINDENBERG GMBH (DE)

( * ) Notice: Subject to any disclaimer, the term of this patent is extended or adjusted under 35 U.S.C. 154(b) by 189 days.

(21) Appl. No.: 14/031,466

(22) Filed: Sep. 19, 2013

(65) Prior Publication Data

US 2014/0076154 A1    Mar. 20, 2014

(30) Foreign Application Priority Data

Sep. 20, 2012 (DE) .......... 10 2012 018 649

(51) Int. Cl.

| | |
|---|---|
| *B64C 3/38* | (2006.01) |
| *B64C 5/10* | (2006.01) |
| *B64C 9/00* | (2006.01) |
| *B64C 13/00* | (2006.01) |
| *F15B 9/17* | (2006.01) |
| *F15B 15/14* | (2006.01) |
| *F15B 15/20* | (2006.01) |
| *B64C 13/40* | (2006.01) |

(52) U.S. Cl.
CPC .............. *F15B 9/17* (2013.01); *F15B 15/149* (2013.01); *F15B 15/202* (2013.01); *B64C 13/40* (2013.01); *F15B 2215/30* (2013.01); *Y10T 29/49405* (2015.01)

(58) Field of Classification Search
CPC ...... B64C 13/40; F15B 15/149; F15B 15/202; F15B 9/17; F15B 2215/30
See application file for complete search history.

(56) References Cited

U.S. PATENT DOCUMENTS

| 2,751,752 | A | * | 6/1956 | Metcalf | ................ | B64C 13/00 |
| | | | | | | 244/227 |
| 3,062,192 | A | * | 11/1962 | Webb | .............................. | 91/459 |
| 3,095,906 | A | * | 7/1963 | Kolm, Jr | ................ | 137/625.62 |
| 3,185,167 | A | * | 5/1965 | Zenny Olsen | ................ | 137/85 |
| 3,311,123 | A | * | 3/1967 | Tsien et al. | ..................... | 137/85 |
| 4,150,686 | A | * | 4/1979 | El Sherif et al. | ............. | 137/377 |

(Continued)

FOREIGN PATENT DOCUMENTS

| DE | 603 00 451 T2 | 4/2006 |
| EP | 0 686 776 A1 | 12/1995 |

OTHER PUBLICATIONS

German Search Report dated May 16, 2013; 5 pages.

*Primary Examiner* — Philip J Bonzell
(74) *Attorney, Agent, or Firm* — Carter, DeLuca, Farrell & Schmidt, LLP

(57) ABSTRACT

The invention relates to a flap actuator, in particular to a servo/spoiler actuator, comprising at least one electrohydraulic servo valve and at least one actuator which are hydraulically connected to one another, wherein the actuator comprises at least one actuator housing in and/or at which the at least one channel is arranged by means of which one or more components, preferably likewise arranged in and/or at the actuator housing, are hydraulically connected and wherein no valve block is arranged between the actuator and the servo valve.

4 Claims, 5 Drawing Sheets

(56) References Cited

U.S. PATENT DOCUMENTS

Figure 1:
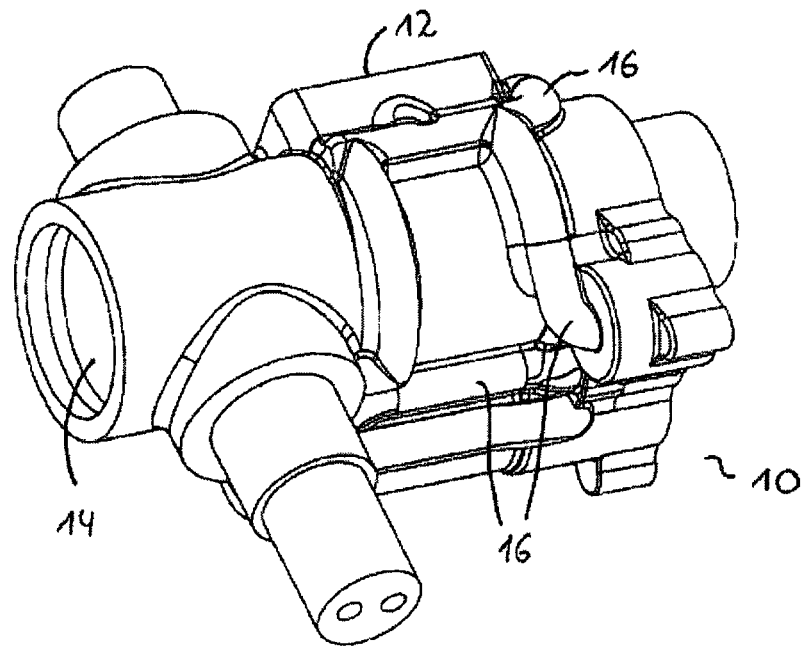
Figure 1:
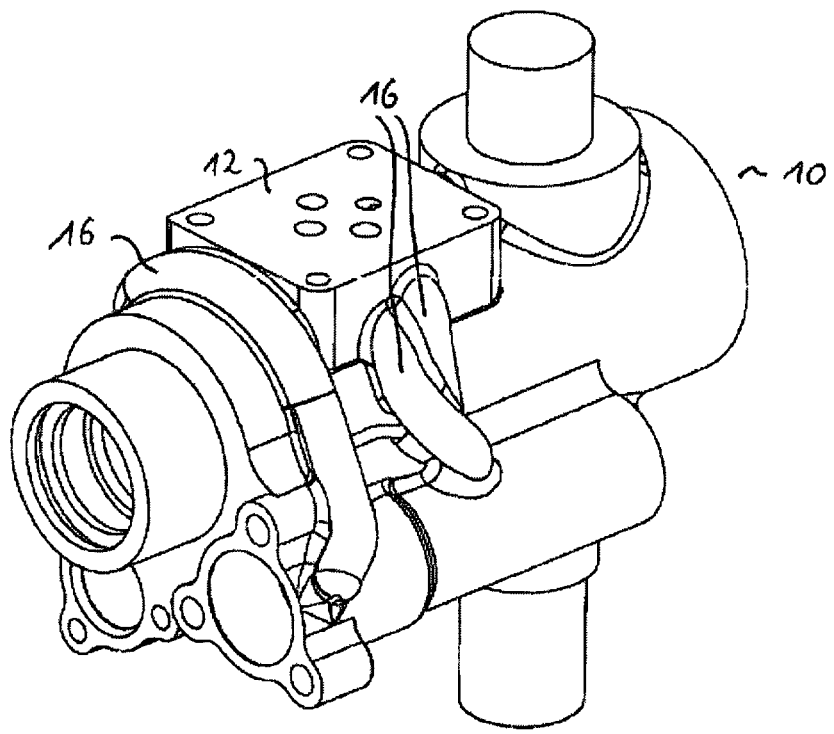

| | | | |
|---|---|---|---|
| 4,269,111 A | 5/1981 | Kamimura | |
| 5,121,042 A * | 6/1992 | Ako | F15B 13/16 |
| | | | 318/135 |
| 5,297,469 A | 3/1994 | Raymond | |
| 6,626,205 B2 | 9/2003 | Hattori et al. | |
| 2005/0199298 A1 | 9/2005 | Farrington | |
| 2009/0183790 A1* | 7/2009 | Moore | 137/597 |
| 2010/0090374 A1* | 4/2010 | Dietrich | B22F 3/1055 |
| | | | 264/497 |

\* cited by examiner

FLAP ACTUATOR

This application claims priority to German Patent Application No. 10 2012 018 649.5, filed Sep. 20, 2012, the entirety of which is hereby incorporated by reference.

The present invention relates to a flap actuator, in particular a servo/spoiler actuator, in particular for aircraft, comprising at least one electrohydraulic servo valve and at least one actuator which are hydraulically connected to one another.

Servo/spoiler actuators known from the prior art comprise the main components: electrohydraulic servo valve (EHSV), the valve block and the actuator (cylinder or piston) which is moved in dependence on the position of the servo valve. This movement is converted into a desired flap movement. In spoiler actuators known from the prior art, the valve blocks are provided with connection bores and transverse bores for transferring the fluid from the servo valve to the actuator. To allow closed hydraulic circuits to arise, the bores are subsequently sealed toward the environment using press plugs.

Such a servo/spoiler actuator is known from U.S. Pat. No. 6,626,205. In this case, the flow channels are worked into the surface of a core arranged in the valve block If the flow circuits are manufactured by drilling, as is the case in accordance with the prior art, transitions result at the intersections and interfaces which are unfavorable flow-wise and which are difficult to define with respect to strength. These transitions have to be reworked in that they are, for example, rounded or deburred in a comparatively complex and/or expensive manner. The interfaces remain sharp-edged at positions in which the bores cannot be reached. This is disadvantageous in that the flow has an unfavorable extent in these regions. Apart from this, the sealing of the hydraulic circuits by means of press plugs is disadvantageous in that the defect complexity is increased. To ensure the required material cross-sections for the plug press fits and for the bores, it is necessary to design the valve blocks as comparatively large. This has the disadvantage of a correspondingly large construction height and of a large weight which are in particular undesirable in the case of aeronautic applications.

It is thus the underlying object of the present invention to further develop a flap actuator of the initially named kind such that its construction height, complexity and weight are reduced with respect to known flap actuators.

This object is achieved by a flap actuator in accordance with the features of claim 1. Provision is accordingly made that the actuator has at least one actuator housing in and/or at which at least one channel is arranged by means of which one or more components are hydraulically connected which are preferably likewise arranged in and/or at the actuator housing and that no valve block is arranged between the actuator and the servo valve.

The present invention is thus based on arranging one or more channels in or at the actuator housing which serve the hydraulic connection of components which can likewise be arranged in the actuator housing.

This brings about the advantage that the valve block otherwise located between the servo valve and the actuator can be omitted, which has the consequence of a reduced complexity, a reduced weight and also a reduced construction height of the total flap actuator, in particular of the servo/spoiler actuator. The task of the valve block in accordance with the prior art is now partly or completely taken over by the actuator housing. A substantial advantage of the present invention comprises the flap actuator or servo/spoiler actuator being of smaller size and lighter than flap actuators known from the prior art. All fluid-conducting channels, bores and lines are preferably manufactured with optimum flow and in a space saving manner in and/or at the cylinder housing, that is are integrated at the actuator housing.

The term "flap actuator" is preferably to be understood as an arrangement by means of which the one or more arbitrary flaps, preferably spoilers, of an aircraft wing can be actuated.

The components in question, of which at least one is arranged in and/or at the actuator housing, can be one or more of the components advanced blocking valve (ABV), maintenance operator (MO), thermal relief valve (TRV), check valve (CV) and filter (Fi). One or more, or preferably all, of these components are preferably integrated in and/or at the housing of the actuator or of the cylinder and are hydraulically connected.

Provision is preferably made that the actuator housing has a layer-wise structure regionally or overall. It is conceivable that the actuator housing is manufactured by a generative process. Selective laser melting (SLM)®, direct metal laser sintering (DMSL), laserCusing®, selective laser sintering, rapid manufacturing, electron beam melting, etc. can be considered, for example. A layer-wise structure of the actuator housing or of the cylinder housing is possible by these processes. Bore extents or channels can be realized by these processes which can otherwise not be manufactured by customary drilling processes. The disadvantage of conventionally produced bores can thus be prevented by the production technique in accordance with the invention. Apart from this, press plugs and closure plugs are preferably dispenses with since the manufacture of the channels by the layer-wise structure can be carried out by generative production such that no openings arise which are to be closed by press plugs and closure plugs.

In a further embodiment of the invention, one or more channels are arranged in and/or at the actuator housing to receive a hydraulic fluid and/or one or more channels to receive electrical lines and/or cables and/or one or more mounts for components such as valves and filters. The cylinder housing, that is the actuator housing with all line channels and component mounts, is preferably manufactured by layer-wise structuring by means of selective melting processes or another process. The valve block thereby becomes superfluous.

As stated, the actuator housing in a preferred embodiment not only serves for the conducting of the hydraulic fluid, but also for receiving cables or electrical lines which can be drawn into the channels.

Provision is made in a further embodiment that the channel or channels is/are integrated into the actuator housing and/or extend(s) on its surface.

Instead of the above-named production process, all processes are also covered by the invention which work in accordance with a similar principle.

Provision is made in a further embodiment of the invention that the functions and components contained in the 2nd stage (power stage) of the servo valve are integrated in the actuator housing and are hydraulically connected.

Provision can furthermore be made that the inflow line and/or the return line is/are located in the bearing bolt close to the pivot axis.

The present invention further relates to a process of manufacturing an actuator housing of a flap actuator, in particular a servo/spoiler actuator in accordance with one of the claims 1 to 7, wherein the manufacture of the actuator housing takes place partly or completely by means of a generative process. The processes elective laser melting (SLM®), direct metal laser sintering (DMLS), laserCusing®, selective laser sintering, rapid manufacturing and electron beam melting are conceivable, for example.

A generic name for generative processes is "additive manufacturing technologies" (cf. ASTM International Standard F2792). The terms "rapid technologies" or "rapid prototyping" are also used (cf. VDI Standard VDI 3404).

It is pointed out at this point that the term "actuator housing" is to be understood as the housing of the actual actuator in which the hydraulically driven, movable element, in particular a piston or the like, is located. The total flap actuator or servo/spoiler actuator thus comprises a servo valve and at least the actual actuator which in turn comprises the actuator housing and the component arranged movably therein. The latter is connected to the flap to be moved in the mounted state.

The present invention further relates to an aircraft, in particular to an airplane, having at least one flap, preferably having at least one spoiler and at least one flap actuator controlling the flap which is a flap actuator in accordance with the present invention. The flap actuator has, in accordance with the invention, at least one servo valve and at least one actual actuator which is in turn directly or indirectly connected to the flap to be moved. This actual actuator can be designed, for example, as a piston-in-cylinder unit, wherein the cylinder is formed by the actuator housing. A piston or the like whose piston rod is directly or in directly connected to the flap to be moved can be movably arranged in the cylinder. The total flap actuator is preferably arranged in the wing or wings and/or in the vertical stabilizer of the aircraft. A reduction in the wing height of aircraft and a fuel saving resulting therewith can be achieved due to the smaller construction height of the flap actuator in accordance with the invention which is substantially due to the omission of the valve block.

Figure 2:
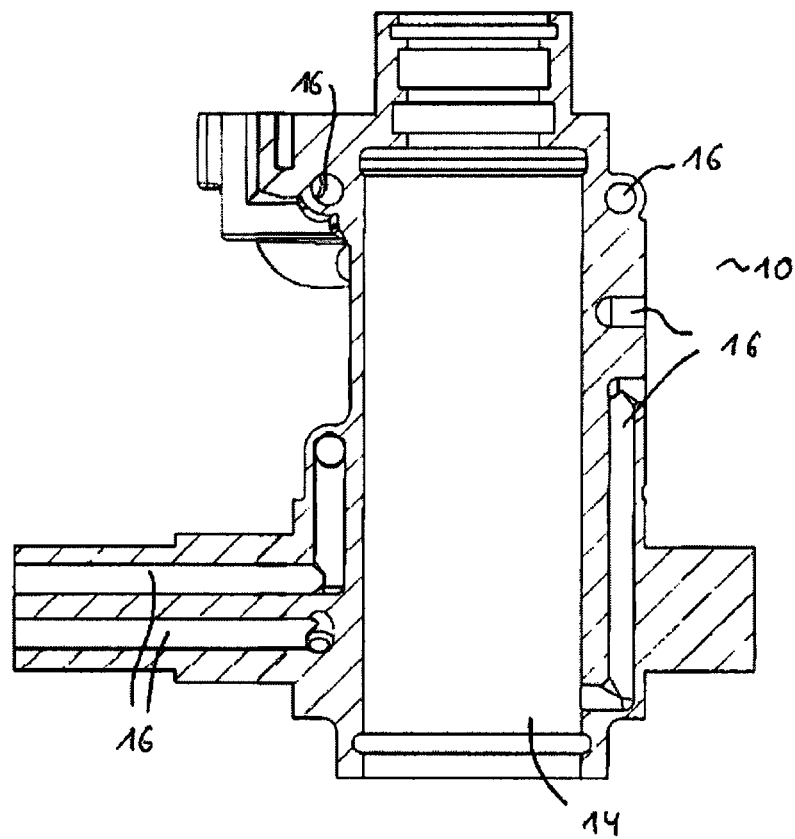
Figure 2:
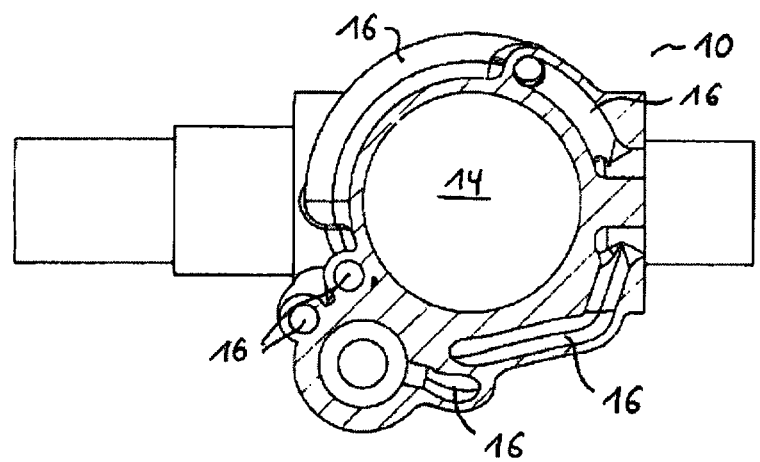
Figure 3:
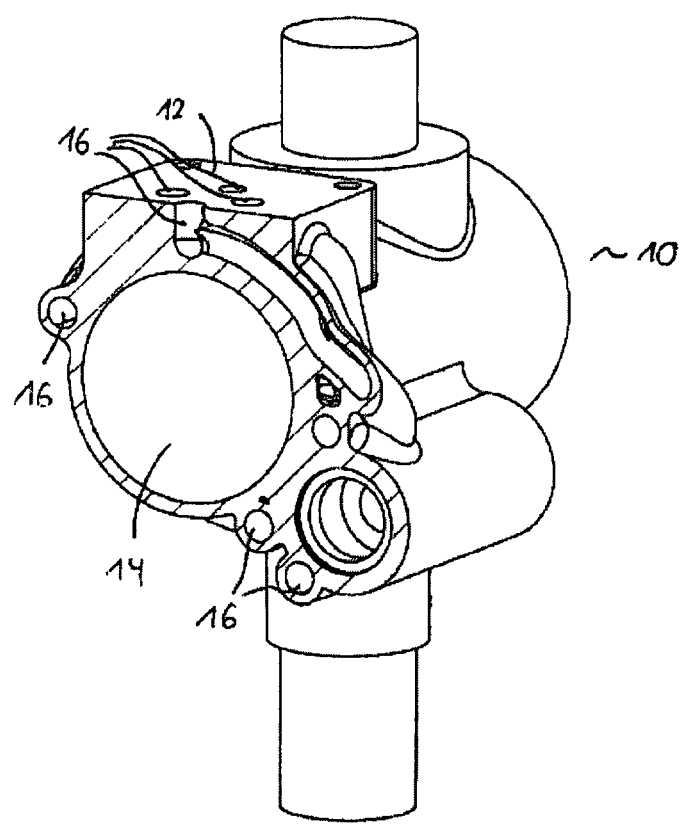
Figure 4:
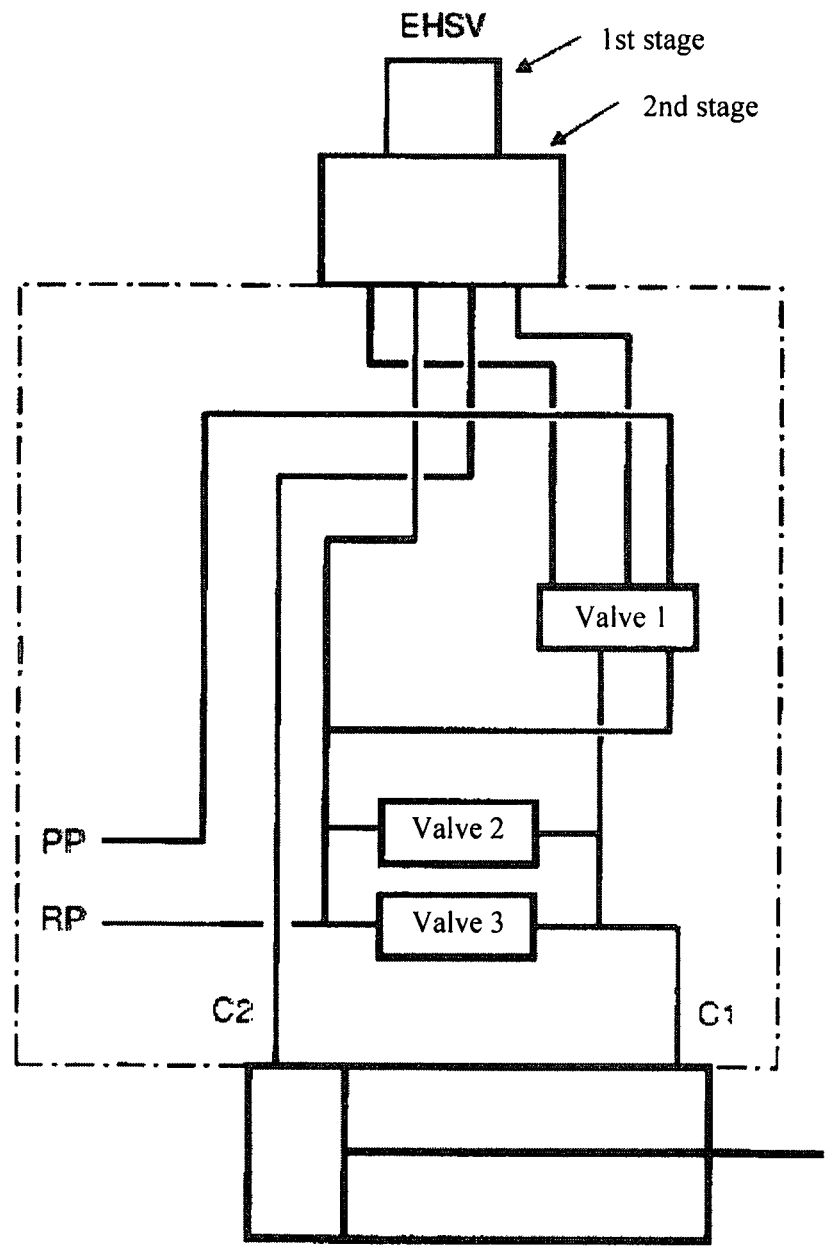
Figure 5:
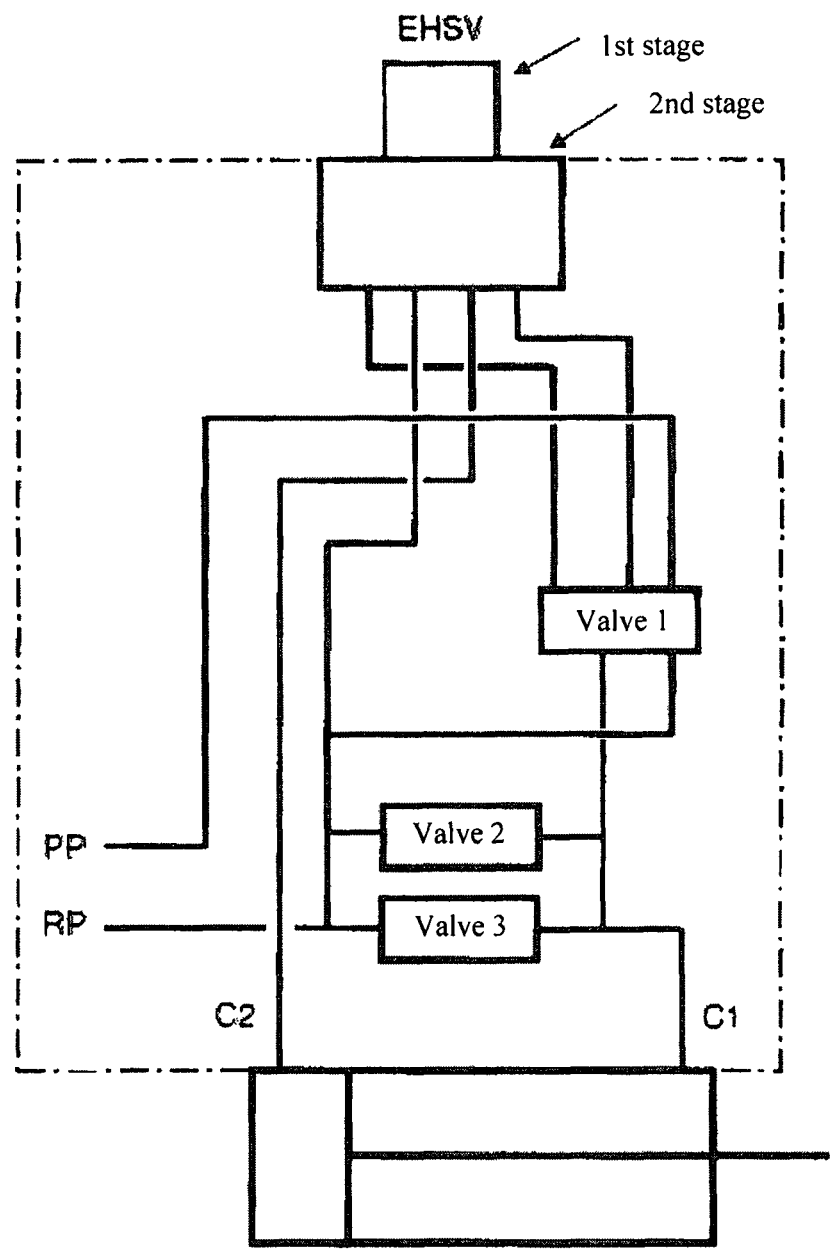

Further details and advantages of the invention will be explained in more detail with reference to an embodiment shown in the drawing. There are shown:

FIG. 1: different perspective views of the actuator housing with outwardly disposed lines;

FIG. 2: different sectional views through the actuator housing in accordance with FIG. 1;

FIG. 3: a further sectional view through the actuator housing in accordance with FIG. 1;

FIG. 4: a circuit diagram of a spoiler actuator in accordance with the invention; and FIG. 5: a circuit diagram of a spoiler actuator in accordance with the invention in a further embodiment.

The actuator housing 10, that is the cylinder housing of a servo/spoiler actuator in accordance with the present invention, is shown in different perspective representations in FIG. 1.

The actuator housing shown in FIG. 1 is manufactured, for example, by selective laser melting (SLM®).

In this process, the material is applied to a plate in powder form and is completely melted by laser irradiation. It forms a solid material layer after solidification. After the manufacture of a layer, powder is again applied and the process is repeated so that a multilayer structure results.

However, any desired other generative production processes are also covered by the invention. In these production processes, the manufacture of the component generally takes place from shapeless materials such as liquids or powders or from shape-neutral materials such as band-shaped or wire-shaped materials by means of chemical and/or physical processes. No special tools which predefine the finished shape of the component such as molds are required in general for the manufacture of a product.

The actuator housing shown in FIG. 1 is a component of a total actuator assembly which comprises the actual actuator as well as a servo valve and which is arranged in a wing of an aircraft.

The actuator comprises the actuator housing 10 shown in FIG. 1 as well as an element, in particular a piston, which is conducted in the cylinder space 14 of said actuator housing and whose movement is transmitted to the flap to be moved, in particular to the spoiler. As can be seen from FIG. 1, the actuator housing 10 has a surface 12 onto which the servo valve is placed and is fastened thereto by screwing, for example.

Hydraulic channels 16 as well as optionally also channels 16 through which the electrical lines and cables run are integrated in and at the actuator housing 10. Furthermore, the functions and components usually contained in the valve block are contained in the actuator housing. They are, for example, the components such as the advanced blocking valve, the maintenance operator, the thermal relief valve, the check valve and the filter. They are integrated and hydraulically connected in the housing of the actuator shown in FIG. 1. Furthermore, all the line channels, bores and component mounts are provided in the cylinder housing in accordance with FIG. 1. A conventional valve block such as is arranged between the servo valve and the actuator from the prior art is omitted, as are press plugs or closure plugs for sealing hydraulic channels, is dispensed with.

As can be seen from the sectional representations in accordance with FIG. 2, the channels 16 of the actuator housing 10 are partly arranged on the surface of the actuator housing, as can also be seen in FIG. 1, and are partly integrated in the base body of the actuator housing 10. The channels 16 in accordance with the present invention can thus be arranged at or in the actuator housing 10.

FIG. 3 shows a further sectional view through the actuator housing 10 in accordance with FIG. 1 and illustrates the arrangement of the cylinder space 14 in the actuator housing in which a piston, not shown, is arranged movable to and fro. The reference symbol 12 again designates the assembly surface for fixing or placing a servo valve. A valve block between the servo valve and the actuator housing 10 shown is omitted.

FIG. 4 shows a circuit diagram which schematically represents the hydraulic lines in the actuator housing. The region surrounded by the chain-dotted line shows the actuator housing. As can be seen from FIG. 4, valves as well as hydraulic lines are, for example, located in the actuator housing. The reference symbols C1 and C2 designate the two hydraulic lines running to the cylinder chambers and the reference symbols BP and RP designate the inflow line or the return lines which can be arranged in the bearing bolt close to the pivot axis. As can be seen from FIG. 4, the electrohydraulic servo valve (EHSV) with its two stages is placed directly on the cylinder housing or actuator housing 10. It is conceivable likewise to accommodate the power stage, that is the second stage of the electrohydraulic servo valve, in the actuator housing 10, as is shown schematically in FIG. 5. In this case, only the first stage of the electrohydraulic servo valve is placed on the actuator housing 10 or fixed to it.

The servo/spoiler actuator or flap actuator in accordance with the invention is of smaller construction and lighter than is known from the prior art due to the omission of the valve housing. All the fluid-conducting channels, bores and lines are preferably manufactured with an ideal flow and are integrated in a space-saving manner in or at the cylinder housing 10. As stated above, electrical lines and cables can likewise be drawn into the channels. Channels can be realized due to the preferred generative manufacture of the cylinder housing 10 which cannot be manufactured by conventional drilling processes. This not only brings about the advantage of an ideal flow guidance, but also the advantage of the dispensing with press plugs and closure plugs such as are required in the use of conventional valve blocks.

The invention claimed is:

1. A servo/spoiler flap actuator comprising at least one electrohydraulic servo valve and at least one cylinder, the servo valve and the cylinder being hydraulically connected, wherein the cylinder comprises at least one cylinder housing, the cylinder housing including at least one channel configured to hydraulically connect one or more components selected from the group consisting of an advanced blocking valve, a maintenance operator, a thermal relief valve, a check valve and a filter, wherein no valve block is arranged between the cylinder housing and the servo valve, the cylinder comprising a mounting surface to which the servo valve is mounted, wherein the channel is integrated in the cylinder housing, wherein at least part of the cylinder housing has a layer-wise structure, and wherein components contained in a 2nd stage of the servo valve are partly or completely integrated in the cylinder housing and are hydraulically connected.

2. A flap actuator in accordance with claim 1, wherein the at least one channel extends on the cylinder housing surface.

3. A method of manufacturing an actuator housing of a flap actuator, in particular of a servo/spoiler actuator in accordance with claim 1, wherein the cylinder housing is manufactured partly or overall by a generative process.

4. A method in accordance with claim 3, wherein the generative process is selected from the group consisting of selective laser melting, direct metal laser sintering, selective laser sintering, rapid manufacturing and electron beam melting.

\* \* \* \* \*